United States Patent [19]
Kragl et al.

[11] Patent Number: 5,799,117
[45] Date of Patent: Aug. 25, 1998

[54] INTEGRATED OPTICAL STRUCTURAL ELEMENT, AND METHOD OF PRODUCING THE SAME

[75] Inventors: Hans Kragl, Ober-Ramstadt; Engelbert Strake, Ober-Ramstdt, both of Germany

[73] Assignee: Robert Bosch GmbH, Stuttgart, Germany

[21] Appl. No.: 663,209

[22] PCT Filed: Jan. 18, 1995

[86] PCT No.: PCT/DE95/00056

§ 371 Date: Sep. 6, 1996

§ 102(e) Date: Sep. 6, 1996

[87] PCT Pub. No.: WO95/19581

PCT Pub. Date: Jul. 20, 1995

[30] Foreign Application Priority Data

Jan. 18, 1994 [DE] Germany .................. 44 01 219.5

[51] Int. Cl.$^6$ ...................................... G02B 6/10
[52] U.S. Cl. ............... 385/14; 264/1.24; 264/1.25; 264/1.29; 385/131; 385/132
[58] Field of Search .................. 385/14, 129, 130, 385/131, 132, 49, 51; 264/1.1, 1.24, 1.25, 1.29

[56] References Cited

U.S. PATENT DOCUMENTS

| 5,513,288 | 4/1996 | Mayer ........................... 385/14 |
| 5,562,838 | 10/1996 | Wojnarowski et al. ......... 385/132 |
| 5,574,806 | 11/1996 | Kragl et al. ..................... 385/14 |

FOREIGN PATENT DOCUMENTS

| 4240950 | 10/1989 | Germany . |
| WO 93/25924 | 12/1993 | WIPO ........................... 385/14 |

*Primary Examiner*—John Ngo
*Attorney, Agent, or Firm*—Michael J. Striker

[57] ABSTRACT

An integrated optical component is proposed, which has an optical component coupled to a waveguide. A buffer layer is provided for improving the coupling. The integrated optical component is produced with the aid of molding techniques. In the process an optical component is placed on a molding die and is adjustedly arranged on a waveguide by means of adjusting tabs. Following molding and removal of the molding die, the optical component is disposed, adjusted in respect to a waveguide, in a substrate plate. The waveguide is filled with a polymer and covered with a cover plate.

25 Claims, 4 Drawing Sheets

INTEGRATED OPTICAL STRUCTURAL ELEMENT, AND METHOD OF PRODUCING THE SAME

BACKGROUND OF THE INVENTION

The invention relates to an integrated optical component and a method for producing an integrated optical component.

A method for producing a cover for an integrated optical circuit is already known from unpublished patent application DE-P 42 40 95 00. In accordance with this method, an optical component is placed on a molding die and in the process is disposed so that it is adjusted in respect to guide tabs, which are intended for the subsequent reception of waveguides, by adjustment devices of the molding die. A curable liquid is poured around the optical component and the molding die. After the liquid has cured, the molding die is removed and a cover containing an optical component which is disposed adjusted on guide tabs is obtained in this way. Subsequently this cover is placed on an integrated optical circuit, containing a waveguide, in such a way that the optical component is coupled with the waveguide.

From the article "Impedance Matching for Enhanced Waveguide/Photodetector Integration" by R. J. Deri, O. Wada in Appl. Phys. Lett. 55 (26), 1989, p. 2712, it is furthermore known to apply a buffer layer between a waveguide and a photodetector, which increases the optical coupling of the photodetector to the waveguide. For this purpose the refractive index of the buffer layer is matched to the refractive index of the waveguide and the refractive index of the photodetector. The buffer layer preferably consists of several layers to improve coupling.

It is known from the article "Analysis of Wavelength-Selective Photodetectors Based on Grating-Assisted Forward Coupling" by Hajime Sakata in Journal of Lightwave Technology, Vol. 11, No. 4, Apr. 1993, p. 560, to employ an integrated photodetector, wherein the waveguide is constructed of different layers and a layer on the surface has a grating structure in the form of rectangular steps. The efficiency of the decoupling of light can be affected by the height of the steps of which the grating is constructed and by the refractive indices involved. The efficiency of the decoupling of light becomes maximal at an optical wavelength which is determined by the grating period used and has a pronounced wavelength selectivity.

SUMMARY

In contrast to the foregoing, the integrated optical component with the features of the invention has the advantage that the optical component can be produced in a cost-effective manner and the placement of the buffer layer on the optical component makes possible an improvement of the evanescent coupling of the waveguide to the optical component. In addition, the inventive integrated optical component has the advantage in contrast thereto that the coupling of the optical component to the waveguide is improved because the adjustment of the optical component on the waveguide is more precise.

In contrast thereto, the method in accordance with the invention for producing an integrated optical component has the advantage that the integrated optical component can be produced simply and cost-effectively by means of molding techniques. In addition, the method employed permits increased adjusting accuracy of the optical component in respect to the waveguide, because of which coupling of the optical component with the waveguide is improved.

Advantageous further developments and improvements of the integrated optical components and improvements of the method are possible by means of the additional steps. It is particularly advantageous to arrange the optical component, the buffer layer and the waveguide together in a substrate plate, since because of this the adjusting accuracy of the optical component with the buffer layer in respect to the waveguide is further increased and coupling is additionally improved.

It is of further advantage to match the refractive index of the buffer layer to the waveguide and the optical component in such a way that coupling of the optical component to the waveguide is increased. It is particularly advantageous to arrange relief strips during the molding of the integrated optical component and, for one, to prevent damage to the optical component during its manufacture in this way and, for another, to exactly define the distance between the buffer layer and the waveguide.

A particularly efficient coupling of the optical component to the waveguide is achieved in that the buffer layer consists of different layers of different thicknesses and/or different refractive indices.

A special embodiment of the buffer layer is achieved in that the buffer layer has heating elements, by means of which the refractive index of the buffer layer is set.

An advantageous embodiment of the buffer layer consists in embodying the buffer layer as a further waveguide.

The wavelength-selective evanescent coupling of the optical component to the waveguide is improved in an advantageous manner in that the buffer layer has periodic changes in height.

Because the optical component has an adjusting groove, it can be adjusted in a particularly simple manner during insertion into the molding tool.

The wave-selective coupling of the optical component to the waveguide is improved in an advantageous manner in that the shape of the waveguide is periodically structured.

The periodic structuring of the waveguide is achieved in a simple manner by means of a periodic variation of the width of the waveguide.

Further advantageous structuring of the waveguide consists in embodying the waveguide periodically structured with a constant width.

In addition, the periodic change of the height of the waveguide provides an improvement of the wave-selective coupling of the optical component.

A further improvement of the wave-selective coupling of the optical component to the waveguide is achieved in that the surface of the optical component is structured as an optical grating.

In an advantageous manner the electrodes of the optical component are designed as an optical grating and in this way they increase the wave-selective coupling of the optical component to the waveguide.

Particularly precise adjustment and thus efficient coupling of the optical component to the waveguide is achieved in that the optical component, which has an adjusting groove, is placed on an adjusting tab of the molding tool and that the optical component is additionally adjusted by means of adjusting tabs along the outer edges of the optical component.

A method of adjusting an optical component on a waveguide with great accuracy is made possible in a simple manner by employing a molding tool which has a waveguide molding element.

The inventive method is improved in an advantageous manner in that the molding tool has a relief strip on which the optical component is placed during insertion. Damage to the active zone of the optical component and thus damage because of breakage of the optical component is prevented by means of this, and the distance between the optical component and the waveguide is exactly fixed.

It is of particular advantage to use an optical component with a buffer layer for producing an optically integrated component, since the buffer layer additionally improves the evanescent coupling of the optical component to the waveguide.

BRIEF DESCRIPTION OF THE DRAWING

Exemplary embodiments of the invention are represented in the drawings and are explained in detail in the description which follows.

DESCRIPTION OF THE PREFERRED EMBODIMENT

Figure 1:
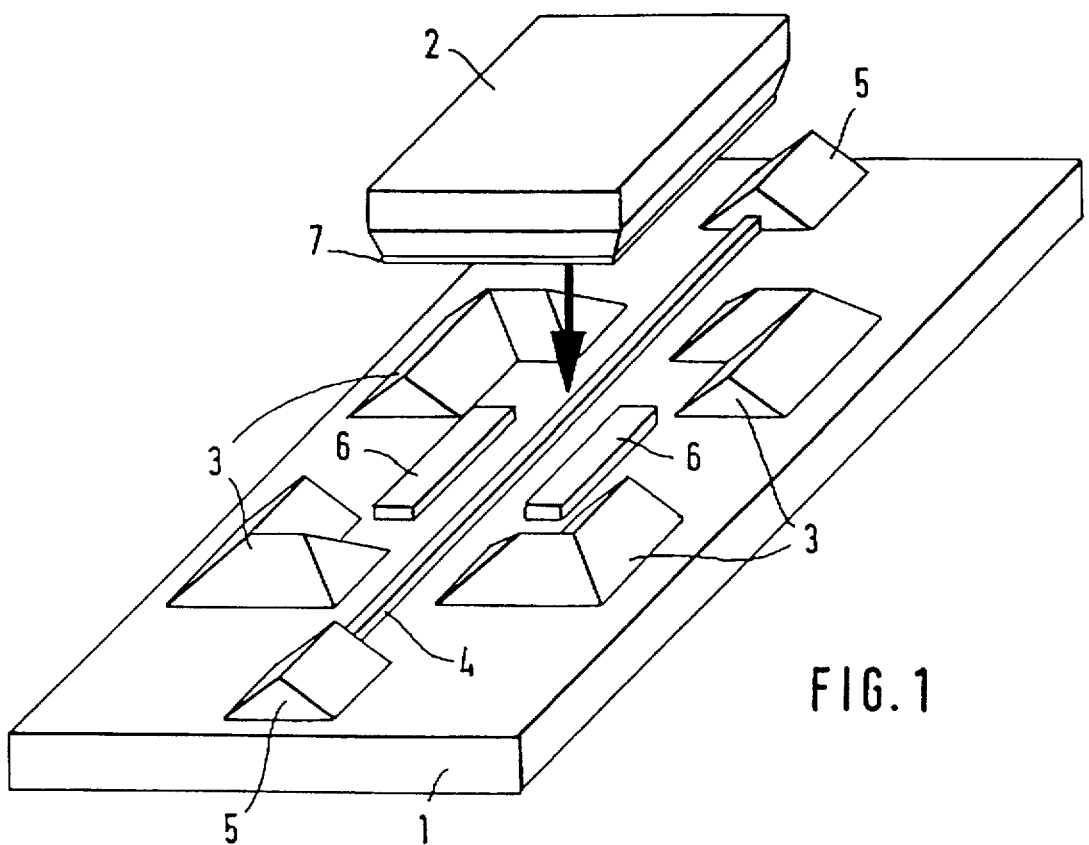
FIG. 1 shows a molding tool with an optical component for producing an integrated optical component, FIG. 2 an integrated optical component, FIG. 3 a further integrated optical component, wherein a photodetector is inserted in the cover plate and the optical component is inserted in the substrate plate, FIG. 4 a molding tool with a waveguide molding element consisting of laterally offset linear sections, FIG. 5 a molding tool with a waveguide molding element which is periodically structured in width and FIG. 6 an optical component with an adjusting groove and a molding tool with an adjusting tab.

FIG. 1 shows a molding tool 1 which has molding elements 5 aligned in a row. A waveguide molding element 4 is disposed between the molding elements 5. A relief strip 6 is disposed on the molding tool 1 parallel with the waveguide molding element 4 on each side along the sides of the waveguide molding element 4. The molding tool 1 has four adjusting tabs 3. The adjusting tabs 3 have an angled rectangular shape, wherein the lateral surfaces come together inclined toward the top. The adjusting tabs 3 are disposed in such a way that they delimit a rectangular surface in which two relief strips 6 are disposed and through which the waveguide molding element 4 extends. An optical component 2 with a buffer layer 7 is disposed above the molding tool 1. In the direction toward the buffer layer 7, the optical component 2 has inwardly inclined outer surfaces. On the inwardly located sides facing the waveguide molding element 4, the adjusting tabs 3 also have inclined surfaces. In the course of inserting the optical component, the space between the adjusting tabs and the optical component narrows in the direction toward the surface of the molding tool 1. An adjustment of the optical component 2 during insertion is achieved in this way. The adjusting tabs 3 can also have other shapes and arrangements. Their function is to adjust the optical component. Depending on their use, one skilled in the art can dispose any arbitrary number of molding elements 5 or omit the molding elements 5. The waveguide molding element 4 can be disposed in any arbitrary form.

The arrangement in accordance with FIG. 1 functions as follows: The optical component 2 is inserted into the molding tool 1 and in the process its corner areas are enclosed by the adjusting tabs 3. The inclination of the outer edges of the optical component 2 and the inner edges of the adjusting tabs 3 permits the sliding of the outer edges of the optical component 2 and the inner edges of the adjusting tabs -3. The space between the adjusting tabs 3 tapers in the direction toward the waveguide molding element 4. In this way the optical component 2 is precisely adjusted in respect to the waveguide molding element 4 by the adjusting tabs 3 during insertion.

After insertion, the optical component 2 rests on the relief strips 6. The relief strips 6 are arranged in such a way that during insertion an active zone of the optical component, for example, is not damaged and simultaneously the distance between the optical component 2 or the buffer layer 7 and the waveguide molding element 4 is exactly fixed.

A moldable material is placed around the inserted optical component 2 or a curable liquid is poured around it. Polymer materials are particularly suited for this. Following curing or molding, the molding tool 1 is removed and an optical component 2 with a buffer layer 7 is obtained, which is adjusted on a waveguide 8 molded by means of the waveguide molding element 4.

It is also possible to employ an optical component 2 without a buffer layer 7 in place of an optical component 2 with a buffer layer 7. It is also possible to employ a molding tool 1 without a waveguide molding element 4 and without relief strips 6 as the molding tool 1. With such a molding element 1 the optical component 2 is adjusted on the molding elements 5 by means of the adjusting tabs 3.

Figure 2:
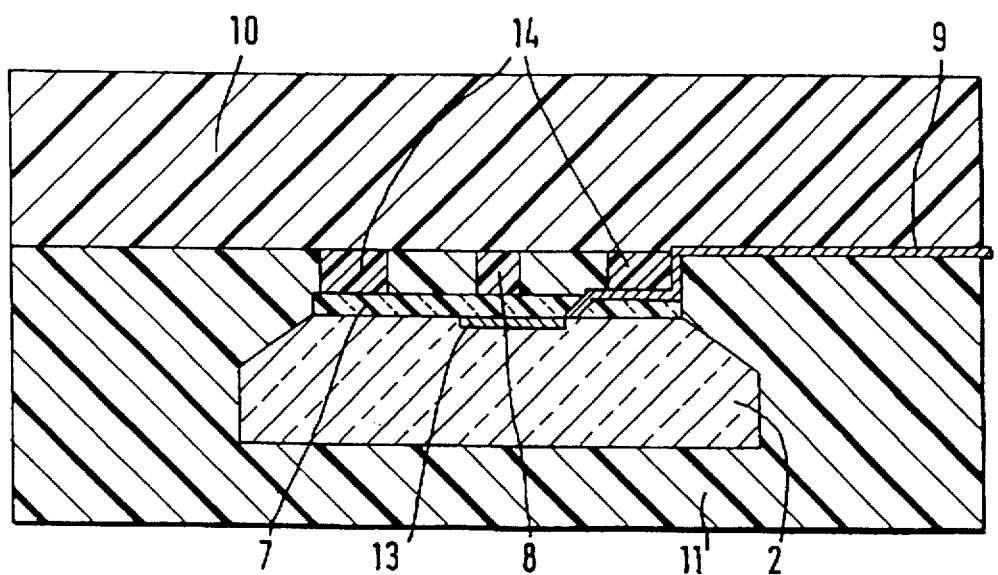

FIG. 2 shows an integrated optical component having an optical component 2 with a photodetector zone 13 and a buffer layer 7. A waveguide 8 is disposed on the buffer layer 7 and is optically coupled to the photodetector zone 13. The photodetector zone 13 is disposed in the optical component 2 underneath the area of the buffer layer 7 which is covered by the waveguide 8.

Pressure relief strips 14 are disposed on the buffer layer 7 to the left and right of and next to the waveguide 8.

The optical component 2, the buffer layer 7, the molded pressure relief strips 14 and the waveguide 8 are inserted into a substrate plate 11 consisting of moldable material or cured liquid. The molded pressure relief strips 14 and the waveguide 8 are covered by a cover plate 10. The cover plate 10, for example, also consists of a moldable material or a cured liquid. The photodetector zone 13 is contacted from the exterior by an electrode 9. The cover plate 10 is glued, for example by means of a prepolymer adhesive, to the substrate plate 11 and the molded waveguide 8 is filled with prepolymer adhesive. After curing, the prepolymer adhesive has a refractive index which is higher than that of the substrate plate 11 and the cover plate 10, and in this way constitutes the waveguide 8. In addition, the prepolymer adhesive fixes the waveguides, which have been inserted into the fiber guide grooves molded on the molding elements 5, in place.

Preferably the waveguide 8 is made of polymer material. The optical component is constituted by a photodetector, for example, which is made from indium phosphide, gallium arsenide or silicon. For example, the photodetector is constituted as a diffusion diode or as a metal-semiconductor-metal structure, such as is described by W. Ng et al. in "High-Efficiency Waveguide-Coupled . . . MSM Detector . . . ", Photonics Technology Letters, Vol. 5, No. 5, May 1993, page 514.

Figure 3:
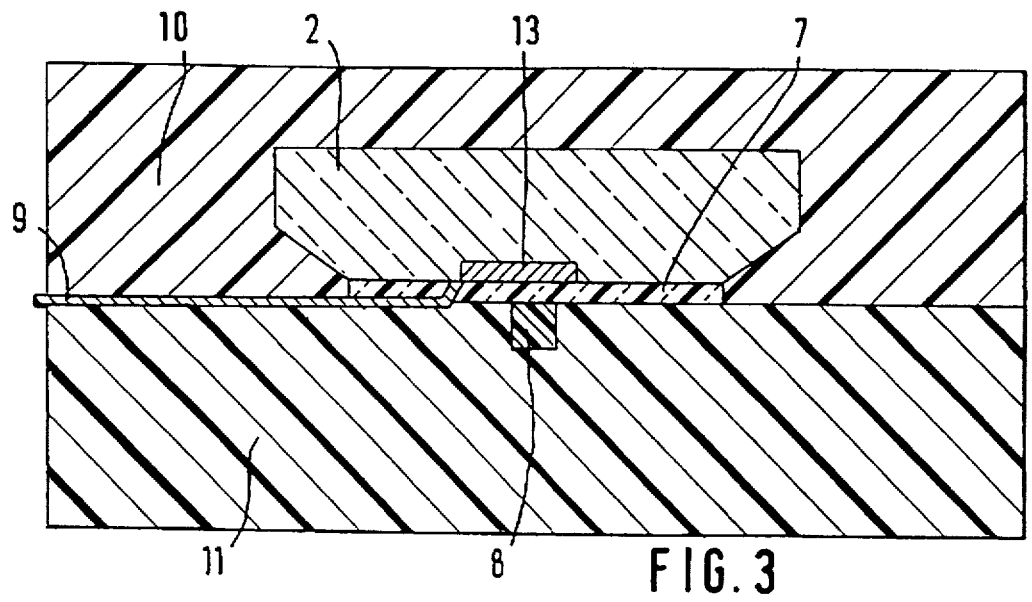

Fig. 3 shows an integrated optical component corresponding to FIG. 2 wherein, however, no molded pressure relief strips 14 are provided and the optical component 2 is located in the cover plate 10.

The cover plate 10 represented in FIG. 3 is obtained if a molding tool 1 is employed which has no waveguide molding element 4 and no relief strips 6. The waveguide 8 is inserted into the substrate plate 11 with the aid of an appropriate molding tool. In addition it is necessary to adjust the substrate plate 11 during placement on the cover plate 10 in such a way that the waveguide 8 rests on the buffer layer 7 in the area in which the photodetector zone 13 is disposed. If an optical component 2 is used, on which no buffer layer 7 has applied, optically integrated components are obtained which have no buffer layer 7.

The buffer layer 7 has an exactly determined thickness and an exactly determined refractive index, which is different from the refractive index of the optical component and from the refractive index of the moldable material or the refractive index of the cover plate 10. The buffer layer 7 can be produced in different ways in accordance with the desired refractive index: for example by vacuum evaporation of an amorphous material such as titanium oxide, by precipitation from the gaseous phase (chemical vapor deposition) or by coating with a suitable polymer material. The buffer layer 7 can consist of a sequence of optically transparent layers of different thicknesses and different refractive indices. It can either be placed on the optical component 2 which is already provided with electrodes 9, or can be arranged between the optical component 2 and the electrodes 9.

Figure 4:
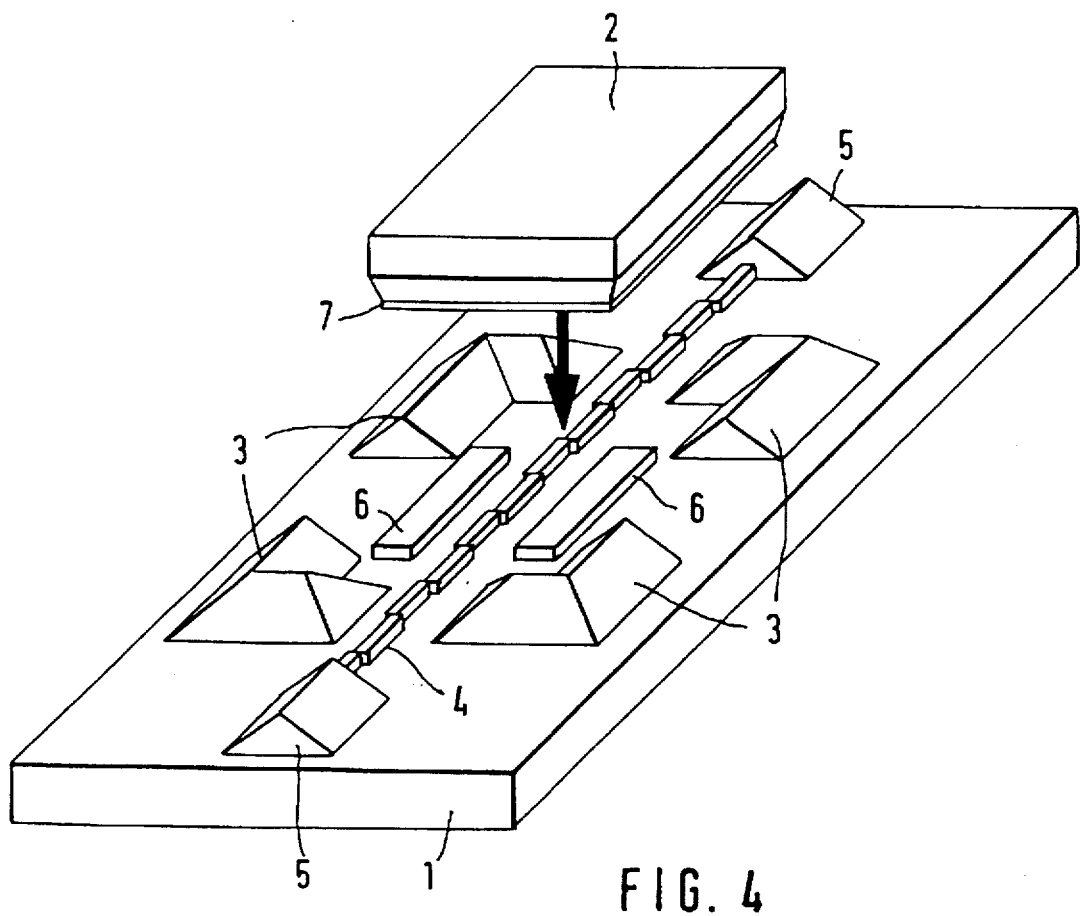

FIG. 4 shows a molding tool 1 in accordance with FIG. 1 wherein, however, the wave molding element 4 consists of laterally offset linear sections. In place of the shape represented, the waveguide molding element can have any periodic structure which improves wave-selective coupling.

A waveguide 8 is molded with the aid of the waveguide molding element 4 represented in FIG. 4 which, because of its periodic structuring, improves the wave-selective coupling of the optical component 2 to the waveguide 8.

Figure 5:
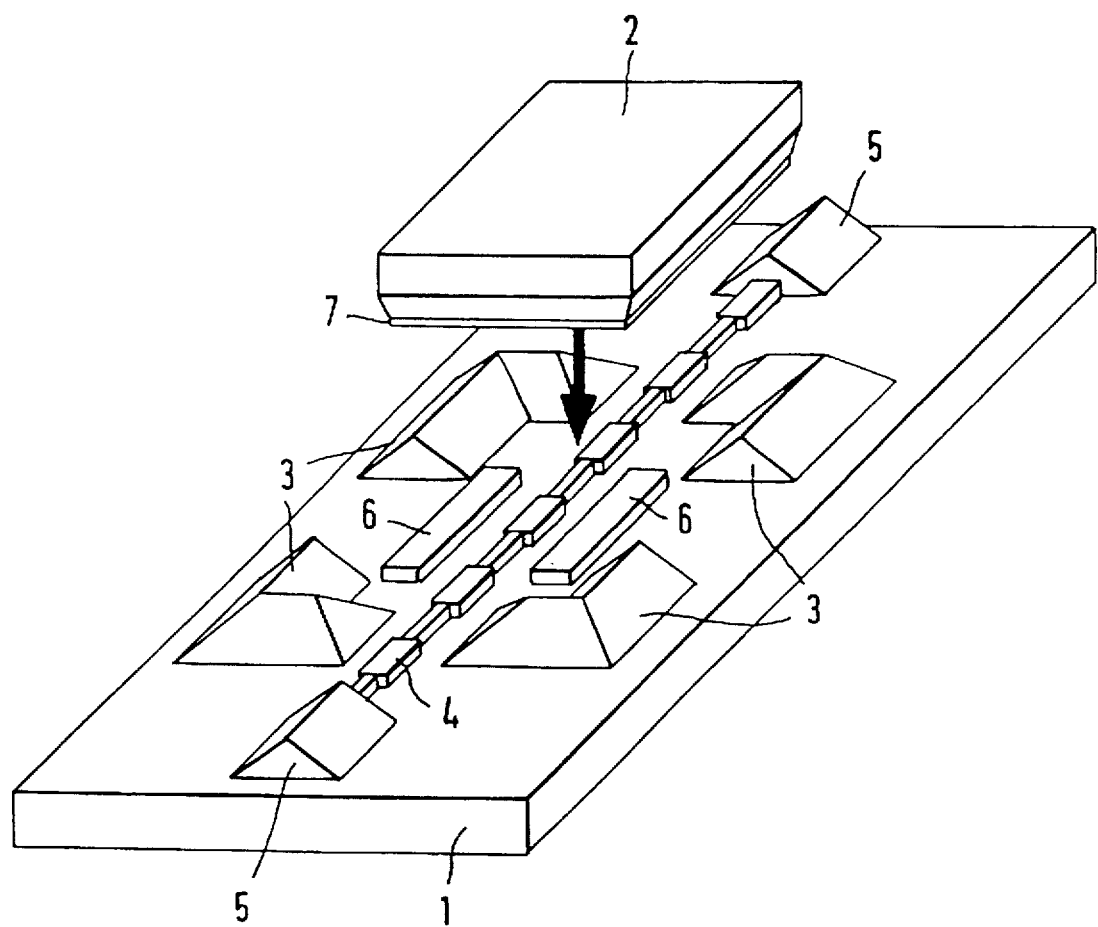

FIG. 5 shows a molding tool 1 corresponding to FIG. 1 wherein, however, the waveguide molding element 4 consists of periodically structured linear sections which alternatingly have a different width. A waveguide 8 is molded with the aid of this wave molding element 4 which, because of its structuring, makes possible the wave-selective coupling of the optical component 2 to the waveguide 8. To correspond to the desired coupling, one skilled in the art selects the form of the waveguide molding element 4 in such a way that the desired wavelength-selective coupling is achieved. One skilled in the art can arrange periodical sine- or cosine-shaped waveguide molding elements for achieving a wavelength-selective coupling. Depending on the use, an arbitrarily structured waveguide molding element can be arranged.

Figure 6:
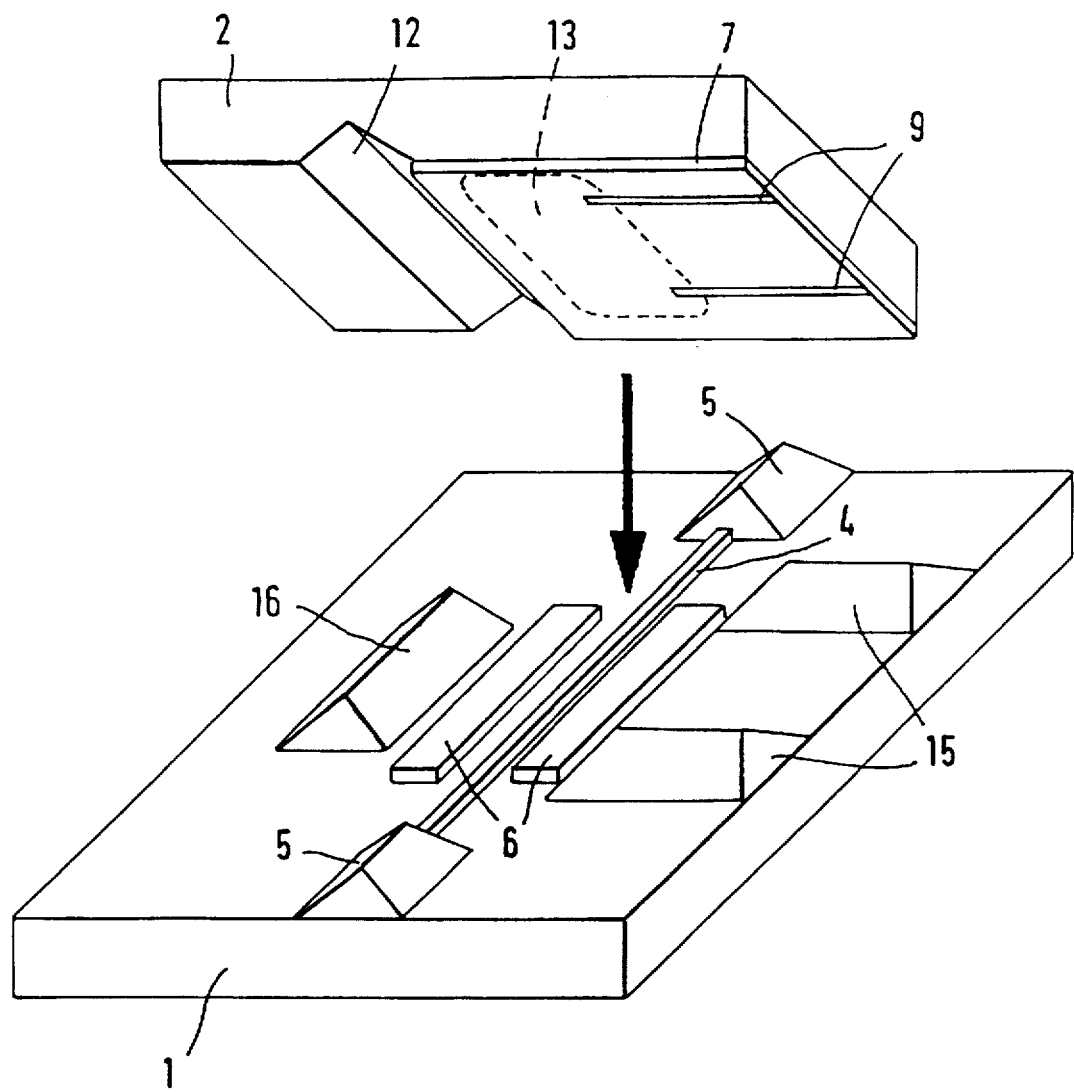

FIG. 6 shows an optical component 2 having an adjusting groove 12, a photodetector zone 13, a buffer layer 7 and electrodes 9. The molding tool 1 has molding elements 5 and a waveguide molding element 4 disposed between the molding elements 5. Relief strips 6 extending parallel with the waveguide molding element 4 are disposed on each side next to the waveguide molding element 4. The molding tool 1 has a first adjusting tab 16 which is disposed parallel with the waveguide molding element 4. In addition, two further adjusting tabs 15 are laterally disposed and are arranged parallel and laterally offset with each other and perpendicular in respect to the waveguide molding element 4.

The position of the first adjusting tab 16 is fixed in respect to the further adjusting tabs 15 by the shape of the optical component 2 used, since the further adjusting tabs 15 laterally adjust an inserted optical component 2 and the first adjusting tab 16 engages the adjusting groove 12 of the optical component 2. The position of the first adjusting tab 16 in respect to the further adjusting tabs 15 is fixed depending on the shape of the optical component 2. It is furthermore possible for only one first adjusting tab 16 and no other adjusting tabs 15 to be disposed.

The first adjusting tab 16 engages the adjusting groove 12 when the optical component 2 is inserted. At the same time the optical component 2 is grasped along its outer edges by the further adjusting tabs 15, so that the photodetectors 13 or the optical component 2 are disposed precisely adjusted in respect to the waveguide molding element 4. After insertion, the optical component 2 rests on the relief strips 6.

An integrated optical component, which was produced with the aid of the molding tool 1 represented in FIG. 6 and the optical component 2 represented in FIG. 6, is constructed in accordance with the integrated component represented and described in FIG. 2, wherein the optical component 2 additionally has an adjusting groove 12. In addition, the areas molded out of the further adjusting tabs 15 are arranged along the outer edges of the optical component 2.

A waveguide 8 which allows wavelength-selective coupling is created by means of the waveguide molding elements 4 represented in FIGS. 4 and 5. Both a codirectional coupling (interaction between two modes running in the same direction, grating period approximately 20 to $100 \cdot 10^{-6}$ m) and a counter-directional coupling (interaction between two modes of different propagation directions, grating period approximately $0.5 \cdot 10^{-6}$ m) are possible. By means of the waveguide molding elements represented in FIGS. 4 and 5, modulation depths of several $10^{-6}$ m can be achieved.

A further possibility of structuring the waveguide 8 consists in varying the height of the waveguide 8. Once the waveguide 8 with the optical component 2 has been inserted into the substrate plate 11, as represented in FIG. 2, the cover plate 10 is periodically structured in the area in which the cover plate 10 rests on the waveguide 8. In this case the buffer layer 7 retains its smooth, unstructured surface. The Bragg structuring of the cover plate 10 takes place independently of the structuring steps of the substrate plate 11, in an advantageous manner simultaneously with the molding of the fiber guide grooves. If, as represented in FIG. 3, the waveguide 8 lies in the substrate plate 11, the bottom of the waveguide 8 is appropriately structured. This structuring step is performed simultaneously with the molding of the waveguide 8 and the fiber guide grooves.

A further wavelength-selective coupling of the optical component 2 to the waveguide 8 is achieved by periodically varying the thickness of the buffer layer 7 and/or the height of the waveguide 8. If the buffer layer 7 is made of a polymer, the grating can be produced by embossing or by phototropy by means of UV light, if the polymer contains additives which are UV light-sensitive.

Structuring the surface of the optical component 2 also makes possible a wavelength-selective coupling to the waveguide 8. For this, an optical grating is applied to the surface of the optical component by means of photosensitive resist techniques, photo-lithography with etching techniques.

A further possibility of obtaining a wavelength-sensitive coupling consists in forming the electrodes 9 periodically for a large grating period, i.e. for codirectional coupling. This is achieved in that, for example, the distance between the electrodes is varied or the electrodes are arranged in a meander shape.

The optically integrated component represented in FIGS. 2 and 3 has a passive waveguide 8 and a hybrid-integrated evanescently-coupled optical component 2 embodied as a photodetector. The photodetector 2 and the buffer layer 7 extend in the linear direction over a portion of the total length of the optically integrated component. The light distributions which are capable of propagation in this absorption area can clearly differ from the light distribution in the passive waveguide 8, depending on the layout of the buffer layer 7. In particular, the number of the modes capable of propagation can be higher. At the start of the absorption zone the output of the modes originally excited in the passive waveguide 8 is distributed to the modes which are capable of propagation here. In the process the mode which is most similar to the mode of the passive waveguide 8 is excited the strongest. The light guided in the waveguide 8 is exponentially damped in the axial direction by absorption.

The absorption behavior can be varied within wide limits without including a periodic structure by a different layout of the buffer layer 7 in respect to the layer sequence, the layer thicknesses and the refractive indeces. For instance, it is possible to achieve that light is evenly absorbed regardless of its polarity, wherein the effective absorption coefficient can be selected to be between 50 and 300 dB/cm. In this way both a practically complete absorption and a monitoring operation with little damping of the passing light are possible. For example, with a wavelength of $1.3 \cdot 10^{-6}$ m and the above described geometry, the maximum value of approximately 300 dB/cm is achieved by means of a $1.22 \cdot 10^{-6}$ m thick buffer layer 7 with a refractive index of 1.514. Polymethylmethacrylate (PMMA) was assumed as the moldable material, wherein the waveguide 8 has a cross section of $(6 \times 6) \cdot 10^{-6}$ m$^2$ and a refractive index higher by 0.005 in comparison with the substrate.

If the buffer layer 7 has a sufficiently large optical thickness, it forms a second, planar waveguide together with the material of the photodetector. It extends parallel with the waveguide 8 and together with it forms a strongly asymmetric vertical directional coupler. Several modes are generally capable of propagation in this directional coupler. Modes exist, whose light distribution is essentially concentrated in the waveguide core. These light distributions penetrate the absorbing optical component only relatively little and therefore only undergo little damping. Modes also exist, whose intensities become maximal in the buffer layer 7 and are therefore damped considerably more strongly. It is now possible to couple light output from modes, which are concentrated in the waveguide 8, over into a mode which assumes its maximum in the buffer layer 7 if a periodic interference of the directional coupler geometry by means of the correct spatial frequency is provided. This frequency is essentially given by the difference between the phase structures of the involved optical modes.

I claim:

1. An integrated optical component having an optical component (2) coupled to a waveguide (8), wherein the optical component (2) and the waveguide (8) are embedded in a moldable material, characterized in that a buffer layer (7) for improving coupling is disposed between an active zone (13) of the optical component (2) and the waveguide (8), and the integrated optical component has a fiber guiding groove connected with the waveguide (8).

2. The integrated optical component in accordance with claim 1, characterized in that the optical component (2), the buffer layer (7) and the waveguide (8) are inserted into a substrate plate (11).

3. The integrated optical component in accordance with claim 1 characterized in that the buffer layer (7) has a refractive index which differs from the refractive index of the active zone (13) and the refractive index of the waveguide (8).

4. The integrated optical component in accordance with claim 1 characterized in that molded relief strips (14) are disposed on the buffer layer (7) and/or on the side of the optical component (2) facing the waveguide (8).

5. The integrated optical component in accordance with claim 1 characterized in that the buffer layer (7) consists of layers of different thicknesses and/or different refractive indices.

6. The integrated optical component in accordance with claim 1 characterized in that the buffer layer (7) has heating elements for setting the refractive index.

7. The integrated optical component in accordance with claim 1 characterized in that the buffer layer (7) is embodied as a further waveguide.

8. The integrated optical component in accordance with claim 1 characterized in that the buffer layer (7) has periodic changes in height.

9. An integrated optical component (2) coupled to a waveguide (8), wherein the optical component (2) and the waveguide (8) are embedded in a moldable material characterized in that the optical component (2) and the waveguide (8) are inserted into a substrate plate (11), and the integrated optical component has a fiber guiding groove connected with the waveguide (8).

10. The integrated optical component in accordance with claim 9 characterized in that the optical component (2) has an adjusting groove (12).

11. The integrated optical component in accordance with claim 9 characterized in that the shape of the waveguide (8) is periodically structured in such a way that a wavelength-selective coupling of the optical component (2) to the waveguide (8) takes place.

12. The integrated optical component in accordance with claim 9 characterized in that the width of the waveguide (8) varies periodically.

13. The integrated optical component in accordance with claim 11, characterized in that the waveguide (8) has a constant width and is periodically structured.

14. The integrated optical component in accordance with claim 11, characterized in that the height of the waveguide (8) has periodic changes.

15. The integrated optical component in accordance with claim 9 characterized in that the surface of the optical component is structured as an optical grating.

16. The integrated optical component in accordance with claim 9 characterized in that the optical component has electrodes (9) and that the electrodes (9) form an optical grating by means of their arrangement or design.

17. A method for producing a substrate plate for an integrated optical component, wherein an optical component (2) is inserted into adjusting tabs (3) of a molding tool (1) and subsequently the substrate plate (11) is produced by pouring a curable liquid around the optical component (2), characterized in that the molding tool (1) has a waveguide molding element (4).

18. The method in accordance with claim 17, characterized in that the optical component (2) has an adjusting groove (12), that in the course of inserting the optical component (2) into the molding tool (1) the adjusting groove (12) is placed on a first adjusting tab (16) and the optical component (2) is additionally adjusted by further adjusting tabs (3) disposed along the outer edges of the optical component (2).

19. The method in accordance with claim 17 characterized in that the waveguide molding element (4) is disposed between molding elements (5).

20. The method in accordance with claim 17 characterized in that in the course of insertion the optical component (2) is placed on at least one relief strip (6).

21. The method in accordance with claim 17 characterized in that on its side which is placed on the molding tool (1), the optical component (2) has a buffer layer (7) for improved coupling of the optical component (2) to the waveguide (8).

22. The integrated optical component in accordance with claim 1, characterized in that the moldable material is polymer.

23. The integrated optical component in accordance with claim 1, characterized in that the active zone is a photodetector zone.

24. The integrated optical component in accordance with claim 9, characterized in that the moldable material is polymer.

25. The integrated optical component in accordance with claim 9, characterized in that the active zone is a photodetector zone.

* * * * *